United States Patent
Barker

(10) Patent No.: US 6,876,441 B2
(45) Date of Patent: Apr. 5, 2005

(54) OPTICAL SENSOR FOR DISTANCE MEASUREMENT

(75) Inventor: Andrew J. Barker, Calgary (CA)

(73) Assignee: Eagle Ray Corporation, Calgary (CA)

( * ) Notice: Subject to any disclaimer, the term of this patent is extended or adjusted under 35 U.S.C. 154(b) by 503 days.

(21) Appl. No.: 10/156,126

(22) Filed: May 29, 2002

(65) Prior Publication Data

US 2002/0180956 A1 Dec. 5, 2002

Related U.S. Application Data

(60) Provisional application No. 60/294,137, filed on May 30, 2001.

(51) Int. Cl.[7] ................................................. G01C 3/08
(52) U.S. Cl. ........................................ 356/5.09; 356/5.1
(58) Field of Search ................................ 356/5.09, 5.1, 356/5.11, 5.15

(56) References Cited

U.S. PATENT DOCUMENTS

| | | | |
|---|---|---|---|
| 3,547,539 A | | 12/1970 | Froome et al. |
| 3,680,101 A | * | 7/1972 | Granqvist ................ 342/127 |
| 4,340,299 A | * | 7/1982 | Mongeon ................ 356/28.5 |
| 4,715,706 A | * | 12/1987 | Wang ........................ 356/5.1 |
| 4,759,623 A | | 7/1988 | Meier |
| 4,856,893 A | * | 8/1989 | Breen ...................... 356/5.09 |
| 4,916,324 A | | 4/1990 | Meier |
| 5,194,907 A | * | 3/1993 | Hayashi ..................... 356/5.1 |
| 5,715,044 A | * | 2/1998 | Hayes ...................... 356/5.09 |
| 5,764,360 A | | 6/1998 | Meier |
| 6,100,540 A | * | 8/2000 | Ducharme et al. ...... 250/559.38 |

* cited by examiner

Primary Examiner—Thomas H. Tarcza
Assistant Examiner—Brian K Andrea
(74) Attorney, Agent, or Firm—Sean W. Goodwin; Linda M. Thompson

(57) ABSTRACT

Apparatus and method are provided for distance measurement to a remote surface using high frequency modulated transmitted and reflected laser beams and phase-shift calculations. To improve phase-shift resolution, the reflected bean is further modulated, before detection, at a high frequency similar yet different from that of the transmitted beam so as create a resulting detector signal having at least a lower frequency signal which is easily detected by a response limited detector. The lower frequency signal retains the phase-shift information and thus enables determination of the phase-shift information with stable, inexpensive low-frequency optical detectors. Three-dimensional mapping can performed wherein one or more apparatus employ a plurality of detectors or a scanner producing a plurality of sequential reflected beams, each of which results in a plurality of phase-shift information for an area on the surface.

19 Claims, 5 Drawing Sheets

OPTICAL SENSOR FOR DISTANCE MEASUREMENT

CROSS REFERENCE TO RELATED APPLICATION

This application is a regular application of U.S. Provisional Patent application Ser. No. 60/294,137 filed on May 30, 2001, the entirety of which is incorporated herein by reference.

FIELD OF THE INVENTION

This invention relates to optical devices for the measurement of distance. In particular, the invention is related to devices wherein an amplitude-modulated beam of light is reflected from a remote surface which may be optically rough, and the phase difference between the transmitted beam and the received reflected beam is used to determine the distance to the remote surface.

BACKGROUND OF THE INVENTION

Existing implementations of the amplitude-modulated, phase-shift measurement technique are capable of very high accuracy when the remote surface is a cooperative target such as a retro-reflective prism. Under these conditions, the reflected beam is of relatively high power when it is received at the instrument, enabling photoelectric detection of even very high frequency modulation to be achieved with a high signal to noise ratio. Under such ideal conditions, at higher modulation frequencies, the distance over which the phase difference between the transmitted and reflected beams cycles through 360 degrees becomes shorter and the greater is the resulting accuracy of distance measurement for a given accuracy of comparative phase measurement.

Simply, an intensity-modulated beam is transmitted from a measuring station, is reflected from a remote surface, and the reflected beam is received back at the measuring station. The phase difference between the transmitted beam and the reflected beam is used to determine the distance from the measuring station to the remote surface. The phase-shift $\phi$ or phase difference in degrees is equal to $360(2d/\lambda)$ and in radians is equal to $2\pi(2d/\lambda)$, where d is the distance to be measured and $\lambda$ is the wavelength associated with the intensity modulation envelope ($\lambda=c/F$, where c is the velocity of light and F is the modulation frequency). As a simple example, for $F=25\times10^6$ Hz, $c=300\times10^6$ m/s and $d=1.5$ m the resulting phase-shift $\phi$ is 90 degrees or $\pi/2$. As is well understood, if $d>\lambda/2$, the phase difference exceeds $2\pi$ radians, leading to ambiguities in the inferred distance which may be resolved by changing the value of F and repeating the measurement. $\lambda/2$ is called the ambiguity interval.

However, when measurements are made on an optically rough surface, the received reflected beam is of low power, particularly if the power of the transmitted beam is limited to prevent any significant risk of damage to the eyes of an operator. Available optical detectors are incapable of measuring low power beams at high frequencies. Accordingly, under low power conditions, the characteristics of the available optical detectors limit the maximum practical modulation frequency, the maximum achievable signal to noise ratio and, consequently, adversely affect the accuracy of distance measurement that can be achieved. Conventional rough surface measurement systems based on modulation phase measurement have achieved ranging accuracies varying between 0.1 mm and several mm, using a measuring beam power typically in the region of 30–50 mW in conjunction with modulation frequencies from around 10 MHz to over 700 MHz. Note that maximum power output allowed for Class IIIA laser products is 5 mW.

Prior art implementations of intensity-modulated, phase-shift measurement techniques have used fast response optical detectors to sense the high frequency modulation of the received reflected beam. Electronic mixing techniques have then been applied to the high frequency electronic output from the detector so as to generate low frequency signals preserving the important phase information. However, if the optical detector is not capable of resolving the information from the beam, then the output will have a low signal to noise ratio.

There is a need for a system which circumvents the limitations of the available optical detectors so as to respond to the reality of low power reflected beams.

SUMMARY OF THE INVENTION

Accordingly, in a preferred aspect of the invention, apparatus and method are provided for distance measurement to a remote surface using a laser beam and phase-shift calculations without encountering frequency response, signal to noise ratio, or bandwidth response limitations associated with fast optical detectors. Before detection, reflected radiation from the surface is further modulated to create a radiation signal having a lower frequency than that characteristic of the transmitted and reflected radiation. The lower frequency radiation signal retains the phase-shift information and thus enables implementation of stable, inexpensive low-frequency optical detectors. An optical modulator is employed to modify the received radiation prior to detection so as to create an additional, low frequency component of optical amplitude modulation that preserves the phase-shift associated with the reflected beam. Thus, the resulting phase-shift can be measured with a precision possible within low frequency waveforms and approaching fundamental physical limits of available optical detectors while still retaining the high modulation frequency for the measuring beam which maximizes the achievable accuracy of distance measurement.

Using a laser measuring beam, a first waveform at a high frequency is applied to the transmitted beam directed at the remote surface. Before receiving a reflected beam at a detector, an additional optical modulator is employed to apply a second waveform at a high but different frequency to the reflected beam. The further modulation of the reflected beam creates an additional low frequency component of optical amplitude modulation at the difference between the first and second frequencies. The low frequency component preserves the phase-shift associated with the reflected beam and can be compared with a corresponding reference phase of the measurement beam. In this way, mixing of the information signal down to a convenient low frequency is achieved optically and prior to detection. As a result, limitations on frequency response, limitations on achievable signal to noise ratio, and limitations on response bandwidth associated with optical detectors may be circumvented, enabling measurement of the phase-shift to an accuracy more closely approaching fundamental physical limits. The advantage gained by mixing down to a lower frequency range is that a greater accuracy of phase measurement is possible. The key inventive step of the present invention is the incorporation of means to modulate the electromagnetic or optical signal, rather than an electronic signal, mixing down to a low frequency range prior to detection. The performance-limiting characteristics of such detectors may then be circumvented, resulting in improved overall accuracy of distance measurement when the received reflected beam is of low power.

Accordingly, apparatus is provided for determining phase-shift between a first second electromagnetic radiation signal which is reflected from a surface as a second electromagnetic radiation signal, comprising a first modulator for modulating the first electromagnetic radiation signal by a first waveform signal having a first frequency; a second modulator for multiplying the first waveform signal by a second waveform signal modulated at a second frequency, the second frequency being different from the first frequency, for establishing a third waveform signal of known phase and having a third frequency equal to the difference of the first and second frequencies; a third modulator for modulating the second electromagnetic radiation signal by the second waveform signal to form a third electromagnetic radiation signal; an electromagnetic radiation detector for receiving the third electromagnetic radiation signal and for establishing a detector output waveform signal having a shifted phase at the third frequency; and a comparator for comparing the known phase of the third waveform signal and the shifted phase for establishing a phase-shift between the first and second electromagnetic radiation signals. Preferably, a controller performs calculations for determining a distance traversed by the first and second electromagnetic radiation signals from the phase-shift. Preferably, the detector is an array of detectors for receiving reflected beams from an area of the surface determining phase-shift and distances across this limited spatial area of the surface. Further, scanning permits sequential determination of phase-shift along a path and ultimately an area of the remote surface 6. Multiple instruments implementing the invention can obtain two and three-dimensions mapping of surfaces.

The above apparatus enables practice of a novel method of determining phase-shift between the first and second electromagnetic radiation signals and the traversed distances to a remote surface comprising the steps of: multiplying the first waveform signal by the second waveform signal modulated at the second frequency for establishing a third waveform signal of known phase and third frequency equal to the difference of the first and second frequencies; modulating the second electromagnetic radiation signal by the second waveform signal to form a third electromagnetic radiation signal; receiving the third electromagnetic radiation signal at the detector for establishing a detector output waveform signal having a shifted phase at the third frequency; and comparing the known phase and the shifted phase for establishing a phase-shift between the first and second electromagnetic radiation signals, the phase-shift being related to the distance to the remote surface. Preferably, high frequency first and second electromagnetic radiation signals are modulated by a second waveform signal having a high second frequency which is substantially equal to the first frequency so that the resulting third frequency is a low frequency which is easily and accurately detected.

DETAILED DESCRIPTION OF THE PREFERRED EMBODIMENT

Figure 1:
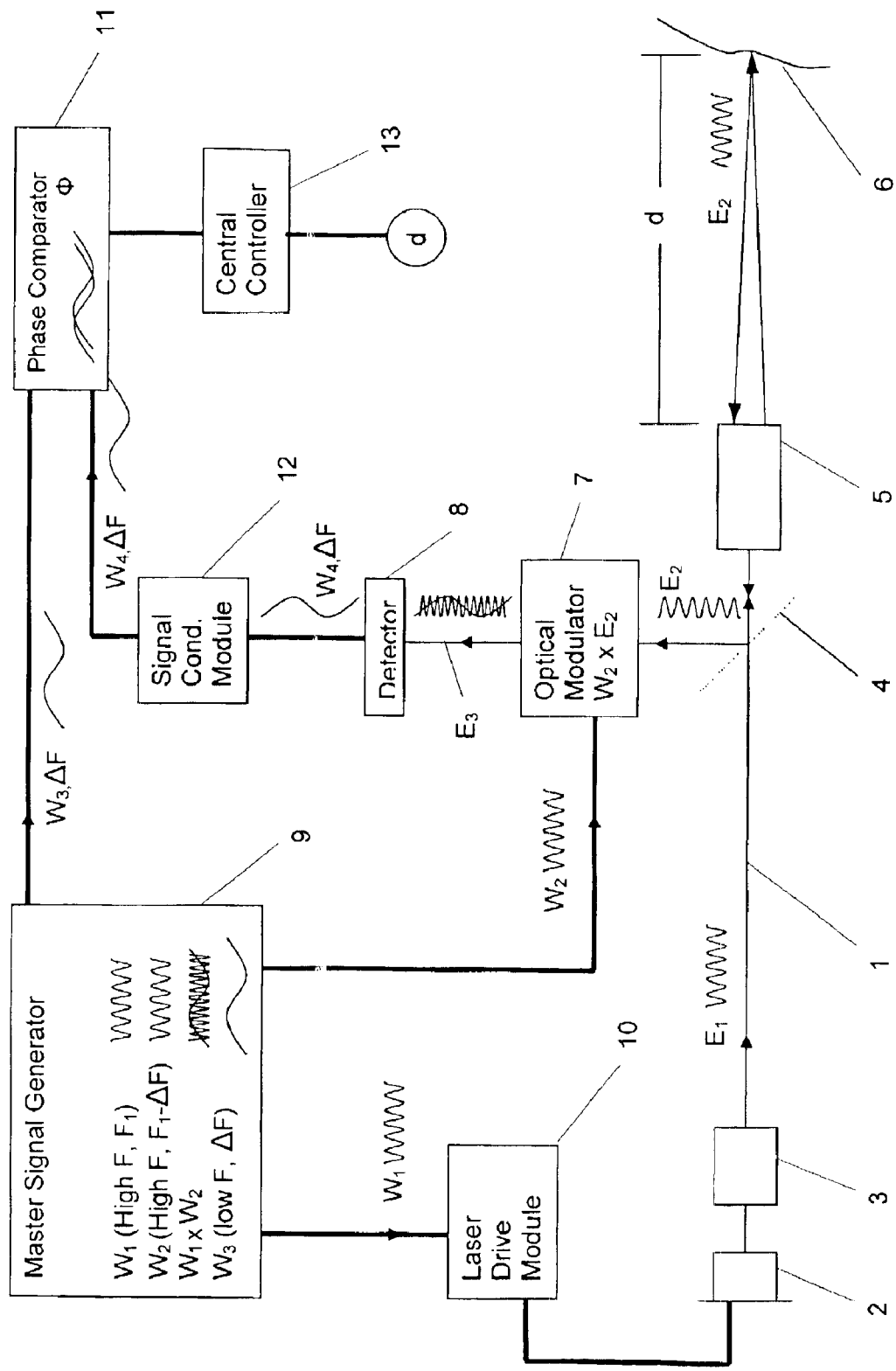
FIG. 1 is a schematic block diagram showing the disposition of key components required to implement the invention.

In FIG. 1, in one embodiment of the invention, a laser, such as an inexpensive laser diode 2, emits electromagnetic radiation as a first electromagnetic radiation signal or beam E1. The laser itself or the beam E1 is modulated and directed through beam-shaping optics 3 and traverses a beam-splitter 4 and through beam expansion and focusing optics 5 onto remote surface 6 spaced from the optics 5 by distance d. The surface 6 may be optically rough which can result in a low power reflection of the beam E1. While the current invention is particularly suited to improving signal to noise upon the refection, it is clear that the apparatus and methods herein provide enhancement of the measurement performance in substantially all cases.

At least a portion of the beam E1 is reflected back from the surface 6 as a second electromagnetic radiation signal or reflected beam E2 which passes back through optics 5. At least a part of the reflected beam E2 is directed by the beam splitter 4 to a modulator 7. For light transmission wavelengths, the modulator may be an optical modulator. The modulator 7 modifies the reflected beam E2 for creating a third electromagnetic radiation signal E3 which impinges upon and is received by at least one electromagnetic radiation or optical detector 8.

A master signal generator 9 supplies electronic signals or waveform signals having characteristics of phase and frequency. Note that herein, that reference numerals prefaced by "W" generally represent waveforms provided as electrical or electronic signals and those prefaced by "E" generally represent waveforms which are present as electromagnetic radiation signals such as optical beams.

The generator 9 generates at least three discrete waveform signals: a first waveform signal W1 at a first frequency $F_1$, a second waveform signal W2 at a second frequency $F_2$, and third waveform signal W3 being one low frequency component resulting from the multiplication of the first and second waveforms W1*W2 (mixing) and having a third difference frequency $\Delta F$. Herein, the modification of an electromagnetic signal by an electronic signal is termed modulation. Similarly, multiplication of one electrical waveform signal by another electrical waveform signal is also deemed to be modulation as the context suggests.

The second waveform signal W2 can have a second frequency $F_2$ of either $F_1-\Delta F$ or $F_1+\Delta F$. Herein, for consistency purposes (herein), this differential signal or second waveform signal W2, is deemed to have a frequency at $F_1-\Delta F$. Waveform signals W1, W2 and W3, having respective frequencies $F_1$, $F_2$ and $\Delta F$ are all phase-locked to a common reference frequency generator having high accuracy and stability. The low frequency $\Delta F$, third waveform signal W3, having a known and reference phase, is fed as a reference waveform to an electronic phase comparator 11.

The first waveform signal W1 is chosen with a high frequency $F_1$ which is used to modulate the transmitted beam E1 through a compatible laser diode drive module 10. Alternately, for some instances, the beam E1 can be continuous and instead be optically modulated by the waveform signal W1.

The reflected beam E2 characteristically retains the same first frequency $F_1$ as the transmitted beam E1 but the reflected beam E2 has a distance-dependent phase-shift φ from that of the transmitted beam 1 due to the distance d traversed.

The second waveform signal W2, having a second frequency $F_2$ or $F_1-\Delta F$, drives the optical modulator 7 so as to modify through multiplication, or mix down, the reflected beam E2 which results in the third electromagnetic radiation signal E3 which contains both a low frequency component $\Delta F$ and a high frequency component $(F_1+F_2)$.

The detector 8 receives the third electromagnetic radiation signal E3 and, subject to the detector's frequency response, produces an output signal Wd containing a least a low frequency signal which is amplified and filtered in a signal conditioning module 12 before being output as a fourth, low frequency waveform signal W4. The fourth waveform signal W4 has the same frequency $\Delta F$ as the third waveform W3 but also includes the phase-shift φ. This low frequency, fourth waveform signal W4 is also fed to the electronic phase comparator 11 for subsequent phase-shift comparison with the reference phase from the third waveform W3 and determination of the value of the phase-shift φ.

An output signal C1 from phase comparator 11 is sampled by a control unit 13 having a microprocessor. Control unit 13 provides processing capabilities for calculating the distance d to remote surface 6 from the phase difference or phase-shift φ reported by the phase comparator 11, and further provides centralized control of the various components including modulator 7, master signal generator 9, laser diode drive module 10, phase comparator 11, and the signal conditioning module 12.

More specifically, the transmitted beam E1 is modulated by the first waveform signal W1 to have a form of $a+b\sin(2\pi F_1 t)$. As a result, the form of the electromagnetic radiation signal of the reflected beam E2 from the remote surface 6 will be substantially of the form $a+b\sin(2\pi F_1 t-\phi)$, having the phase-shift φ component included. In accordance with the present invention, the second waveform signal W2 has the form $c+d\sin 2\pi F_2 t$.

Modulation of the reflected beam E2 by the second waveform signal W2 results in the modified third electromagnetic radiation signal E3. The modulation is a multiplication of the waveform of the reflected beam E2, having the phase-shift φ component therein, and the second waveform W2 as follows:

$$[a+b\sin(2\pi F_1 t-\phi)]*[c+d\sin 2\pi F_2 t].$$

Expansion of the above expression yields four terms:

$$ac+bc\sin(2\pi F_1 t-\phi)+ad\sin 2\pi F_2 t+bd\sin(2\pi F_1 t-\phi)\sin 2\pi F_2 t.$$

The first and second frequencies $F_1$, $F_2$ typically range between 50 MHz and in excess of 1 GHz and even as high as 2 GHz, while the difference or third frequency $\Delta F$ might typically be between 500 Hz and 100 kHz.

The overall response cutoff frequency or response of the detector 8 and of the signal conditioning module 12 are tailored to provide a stable response at $\Delta F$, while remaining very much lower than $F_1$ ($<<F_1$ and $>\Delta F$). Components of the third electromagnetic radiation signal E3 which have frequencies in the range of $F_1$ or $F_2$ are too high to generate a response from the detector 8. Hence, in the expanded expression above, the second and third terms generate no response and do not contribute to the output signal Wd. Further, the first term is a DC component that may be removed by high pass filtering.

This leaves the fourth term which may be further expanded as:

$$\frac{bd}{2}[\cos(4\pi F_1 t+2\pi(F_1-F_2)t+\phi)-\cos(2\pi(F_1-F_2)t-\phi)]$$

Again, the first term, having the predominant and high frequency of $F_1$, is eliminated due to detector frequency limitations which leaves the last term wherein the low frequency component or $F_1-F_2=\Delta F$ remains as follows:

$$\frac{bd}{2}[\cos(2\pi\Delta Ft-\phi)]$$

The above remaining term forms the fourth waveform signal W4 output from detector 7 and includes only a low frequency component at frequency $\Delta F$ however it continues to retain the phase-shift φ characteristic of the reflected beam E2.

As stated, the low frequency $\Delta F$, fourth waveform signal W4 is fed to the electronic phase comparator 11 for phase-shift comparison with the reference phase from the third waveform W3 for establishing a value for the phase-shift φ and determination of the distance d to the remote surface 6 such as through solution of $\phi=2\pi(2d/\lambda)$ where φ is in radians and upon resolution of inferred distance ambiguities.

Figure 2:
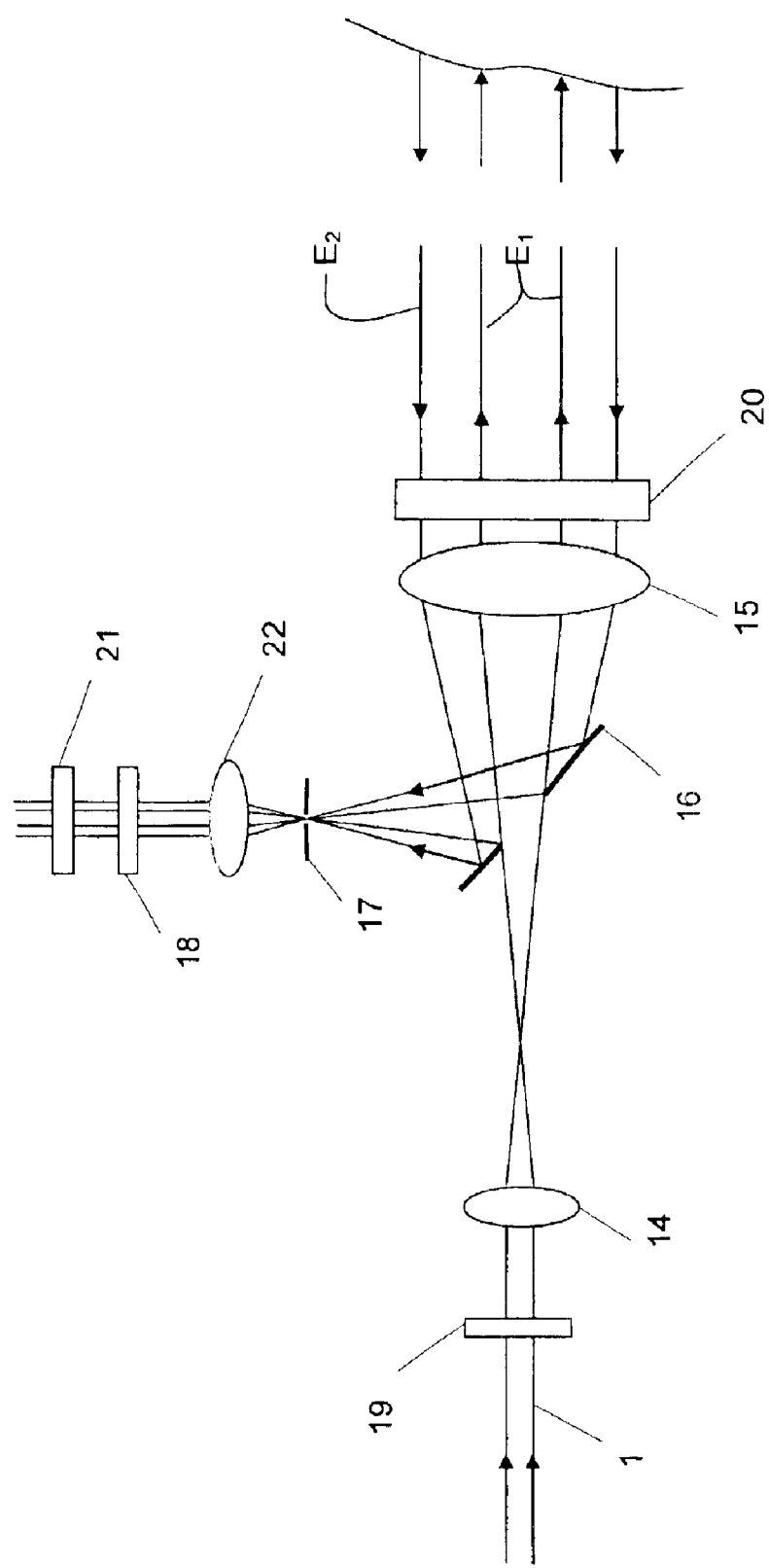
FIG. 2 shows an arrangement of optical components to optimize the measurement accuracy of the invention.

Measurements can be further improved using additional optics. With reference to FIG. 2, an arrangement of optical components may be used in the vicinity of beam-splitter 4 to minimize the degradation of measurement accuracy caused by back reflections from internal optical surfaces, and by collection of ambient light illuminating the remote surface 6. Accordingly, beam E1 is expanded by lens 14 and collimated by under-filled lens 15 to form a focused spot on remote surface 6 (not shown). If the surface 6 is optically rough, the back-reflected radiation is scattered into a wide angle, ensuring that the received radiation completely fills the aperture of lens 15. Under these conditions, beam-splitter 4 may be replaced by aperture mirror 16 to minimize internally generated scatter from the output beam. Spatial filter 17 limits the collection of ambient light to that in the immediate vicinity of the focused spot on the remote surface 6. A polarizing filter 18 may also be used to reduce the intensity of stray reflections of a linearly polarized output beam E1 from internal optical surfaces. If output beam E1 is not naturally linearly polarized to a high degree, an additional polarizing filter 19 may be included to create a linearly polarized beam. A quarter wave plate 20 may be used to rotate the plane of polarization of the returning reflected beam E2 to ensure efficient transmission of the beam E2 through polarizing filter 18. However, if the remote surface 6 is optically rough, the reflected beam E2 will normally be de-polarized to the extent that wave plate 20 serves no useful purpose. Narrow band optical filter 21 further rejects ambient light by limiting the wavelength of collected radiation to a narrow band centered on the wavelength of the laser diode source. Finally, lens 22, and subsequent optical components, are chosen to achieve efficient transmission through optical modulator 7.

Various modifications to the apparatus and methodology can be made in additional embodiments. Optical modulator 7 may be an acousto-optic or electro-optic device. Further, as with known implementations of amplitude-modulated, phase measurement techniques for distance sensing, it is necessary to use more than one modulation frequency $F_1$ on the transmitted beam E1 (or some other coarse ranging method) to eliminate the uncertainty associated with the range ambiguity interval $3 \times 10^8/(2F_1)$ meters. The master signal generator 9 may be designed to provide additional drive and reference frequencies as required. The optical modulator 7 may also form part of an automatic control loop to regulate the average power level of the beam E3 received by the detector 7. However, it is then necessary to compensate for any amplitude-dependent phase-shifts exhibited by the modulator in conjunction with the modulator driver.

Any source of electromagnetic radiation may be employed to implement the invention, but a laser source provides the most intense output beam. Of available laser sources, a laser diode emitting visible or near-infrared radiation is the most appropriate since it is compact, electrically efficient, and provides adequate beam power and beam quality. Use of superluminescent diode sources may be preferred to minimize optical effects associated with laser speckle. Further, laser diodes can be directly modulated at very high frequency. If the source is not capable of being directly modulated, an additional optical modulator may be incorporated between beam shaping optics 3 and beam-splitter 4. Electromagnetic radiation wavelengths may range from 200 nm to 50 $\mu$m, but telecom wavelengths (1300–1550 nm) are particularly useful as inexpensive emitting hardware is commercially available.

The detector 8 may be optimized to suit the particular electromagnetic radiation signal and the detection difference frequency $\Delta F$. For visible or near infrared radiation a small area silicon or indium gallium arsenide diode coupled to a low-noise transimpedance amplifier is a suitable choice.

For developing a two or three dimensional map of the remote surface, a plurality of distance measurements can be obtained using one or more instruments implementing the present invention and wherein the one ore more instruments implement optical modulation of a plurality of reflected beams. For obtaining a plurality of reflected beams E2, and the phase-shifts associated therewith, either the detector 8 is provided with some spatial-capability for receiving a plurality of modulated electromagnetic signals E3 or a spatially limited detector is provided with a plurality of sequential signals E3. In the former case, a modulator 7 of sufficient aperture or a plurality of modulators modify a plurality of reflected beams E2 and impinge the modified beams E3 onto an array detector. Accordingly, distance measurements may be made over an area or an array of locations at the remote surface for which plurality of detector output waveform signals correspond. Alternatively, the measuring beam E1 may be directed along a path across remote surface 6 by means of an optical scanning mechanism located between focusing optics 5 and the remote surface 6. Such a device capable of such precision targeting are direct driven, gimbaled or fast steering mirrors positioned between the optics and the surface. A plurality of reflected beams E2 are processed by the detector 7, preferably sequentially, for sequential determination of each phase-shift $\phi$ and the traversed distance d at each location on the surface.

EXAMPLE 1

Figure 3:
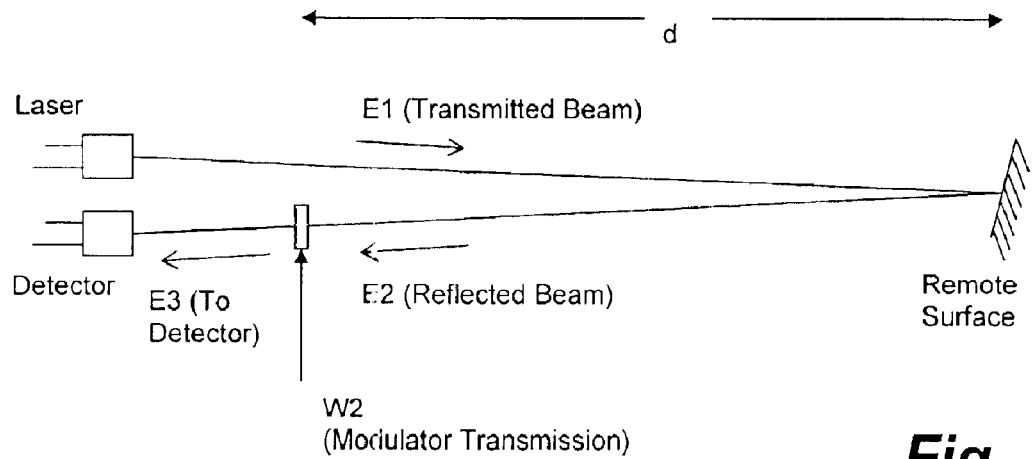
FIG. 3 is a schematic illustrating a the apparatus of a first crude theoretical example of the invention.

With reference to FIGS. 3–8, a simplified practical theoretical example is provided in which a transmitted beam having waveform E1 at a frequency $F_1$ of 1 GHz, is directed at a remote surface 6. A reflected beam E2, retaining frequency $F_1$, is modulated using a modulating waveform W3, at frequency $F_2$, for creating a mixed electromagnetic radiation signal E3 before being received at the detector 7. The frequency $F_2$ of the modulating beam W3 was chosen to result in a difference frequency $\Delta F$ which more practically and graphically illustrates the resulting phase-shift $\phi$. Basically E1=$\sin(2\pi F_1 t)$
where $F_1$=1 GHz, no DC offset; and E2=$\sin(2\pi F_1 t - \phi)$
where E2 is phase-shifted E1 due to round trip 2d;
$\phi = 4\pi F_1 d/c$, $c = 3 \times 10^8$ ms$^{-1}$; and
d=(37.5+n*150)mm yields $\phi = \pi/2$ radians The transmitted and reflected waveforms E1,E2 are shown in FIG. 3.

According to the present invention, the modulating waveform W3 at frequency $F_2$ is applied to the reflected waveform E2. In an actual application applied for high accuracy, a modulating frequency $F_2$ would be selected which is very nearly the same as the transmitted frequency $F_1$, such as $F_2$=0.999999 GHz, shifted from $F_1$ only by a $\Delta F$ of 1 kHz. However, the resulting relative frequency $(F_1-F_2)/F_1 = 10^{-6}$ is difficult to depict graphically.

Figure 4:
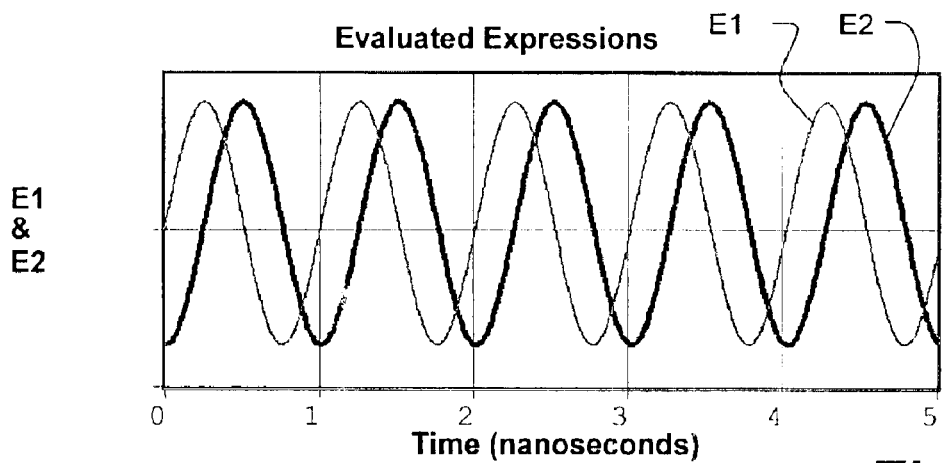
FIG. 4 is a graph according to the first example of FIG. 3, illustrating the phase-shifted detector responses of the transmitted and reflected beams E1,E2.

Accordingly, with reference to FIG. 4, and (example purposes) so as to visualize the key aspects of result of the method of the invention, consider instead the case when $F_1$=1 GHz and $F_2$=0.95 GHz.

W2=$\sin(2\pi F_2 t)$
$F_2$=0.95 GHz, no DC offset
$F_2$ shifted from $F_1$ by 0.05 GHz Multiplying the reflected signal E2 by the modulating third waveform E2,W3 results in an output signal E4 as follows:

$$\begin{aligned}E4 &= E2 * W2 = \sin(2\pi F_1 t - \phi) * \sin(2\pi F_2 t) \\ &= 0.5\cos\{2\pi(F_1 - F_2)t - \phi\} - 0.5\cos\{2\pi(F_1 + F_2)t - \phi\} \\ &= 0.5\cos(2\pi * 10^3 t - \phi) - 0.5\cos(2\pi * 1.999999 * 10^9 t - \phi) \\ &= W4 - W6\end{aligned}$$

Where:
W4 is at a frequency which can be sensed by the optical detector; and
W6 is beyond the frequency limit of conventional detectors.

Therefore with $F_1$=1 GHz and $F_2$=0.95 GHz, and a value of $\pi/2$ radians for the distance-related phase-shift $\phi$, we have E2=$\sin(2\pi*10^9 t - \pi/2)$, and E3=$\sin(2\pi*0.95*10^9 t)$.

Figure 5:
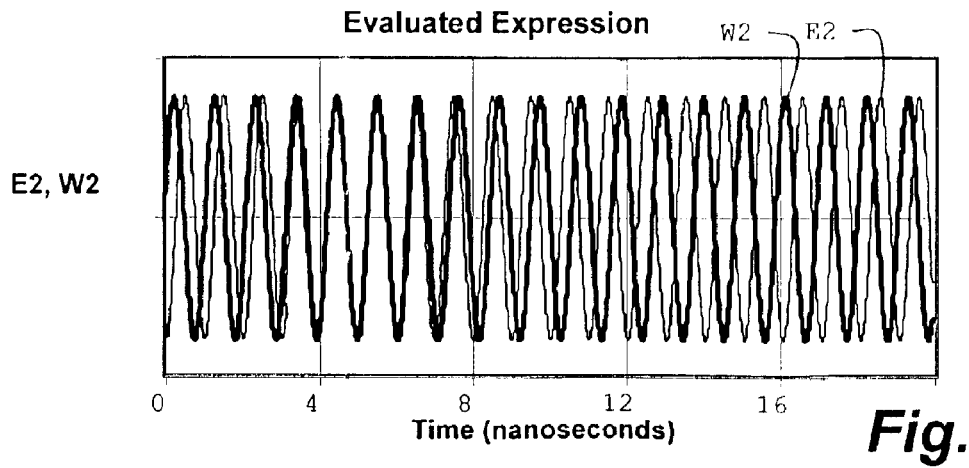
FIG. 5 is a graph according to the-first example of FIG. 3, illustrating the separate waveform signals of the reflected beam E2 and the modulating second waveform signal W2.
Figure 6:
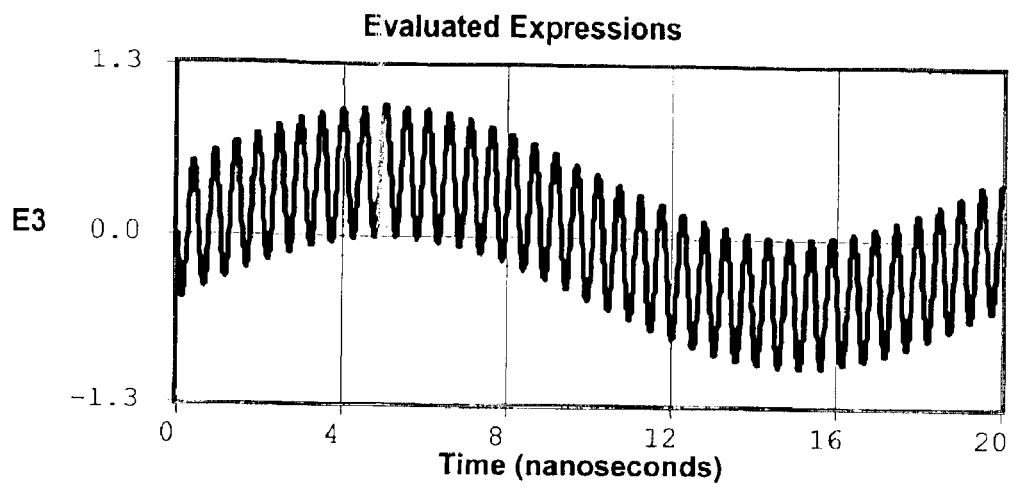
FIG. 6 is a graph according to the first example of FIG. 3, illustrating the electro-optical multiplication or modulation of signals E2×W2 of the respective waveform signals of the reflected beam E2 and the modulating waveform signal W2.
Figure 7:
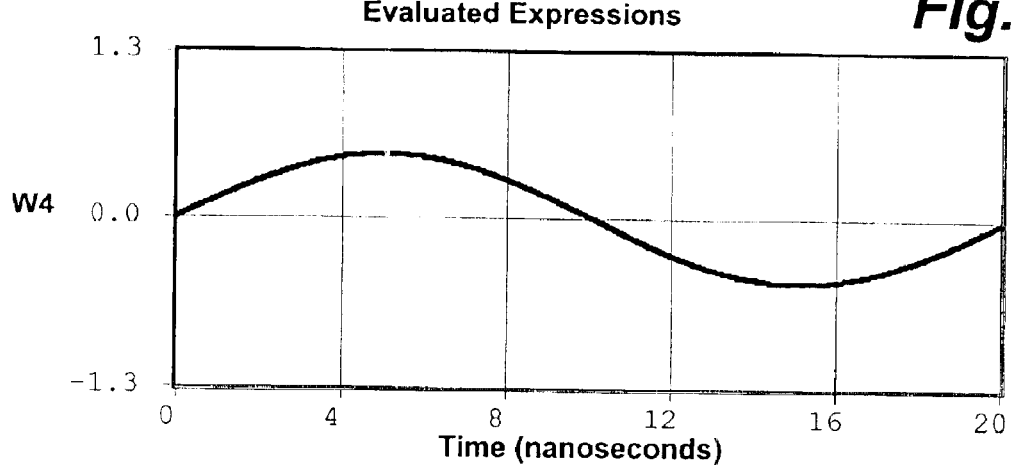
FIG. 7 is a graph according to the first example of FIG. 3, illustrating the low frequency component W4 of the signal E3 of FIG. 6.
Figure 8:
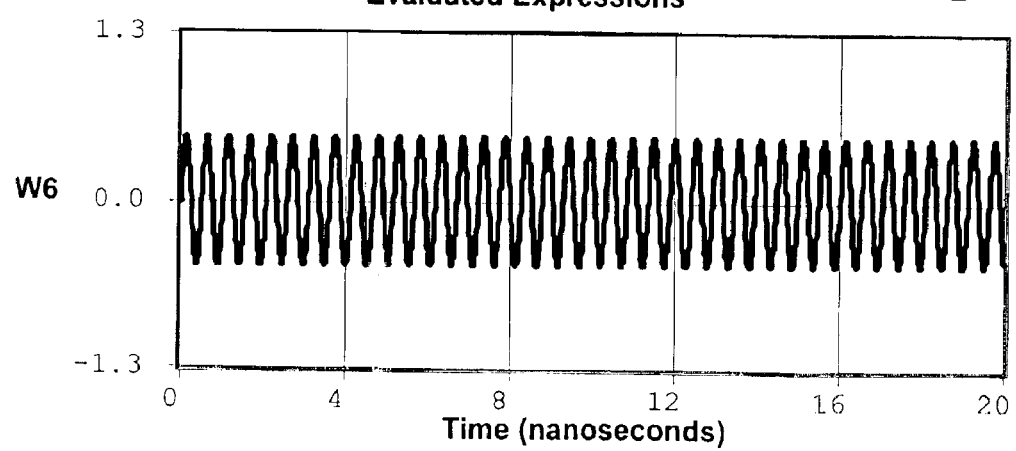
FIG. 8 is a graph according to the first example of FIG. 3, illustrating the high frequency component S6 of the signal E3 of FIG. 6.

Turning to FIGS. 5–7, waveforms E3, W4 and W6 result. Transmitted and received waveforms E1,E2 are at an accurate, high frequency F. The modulating waveform is also at a high frequency but at a slightly different frequency, shown herein as slightly slower. As a result of combining the waveforms E2 and W2, the waveform W4 results which is the difference of the two waveforms exhibiting the same phase-shift $\phi$.

Waveform W4, is a cosine wave preserving the $\pi/2$ phase-shift, and is advantageously at a measurable and low frequency difference of $F_1-F_2$, while W6 is at a high frequency sum of $F_1+F_2$. It is the phase $\phi$, imposed on the measuring beam at frequency $F_1$ that enables measurement of the round trip distance d.

EXAMPLE 2

Figure 9:
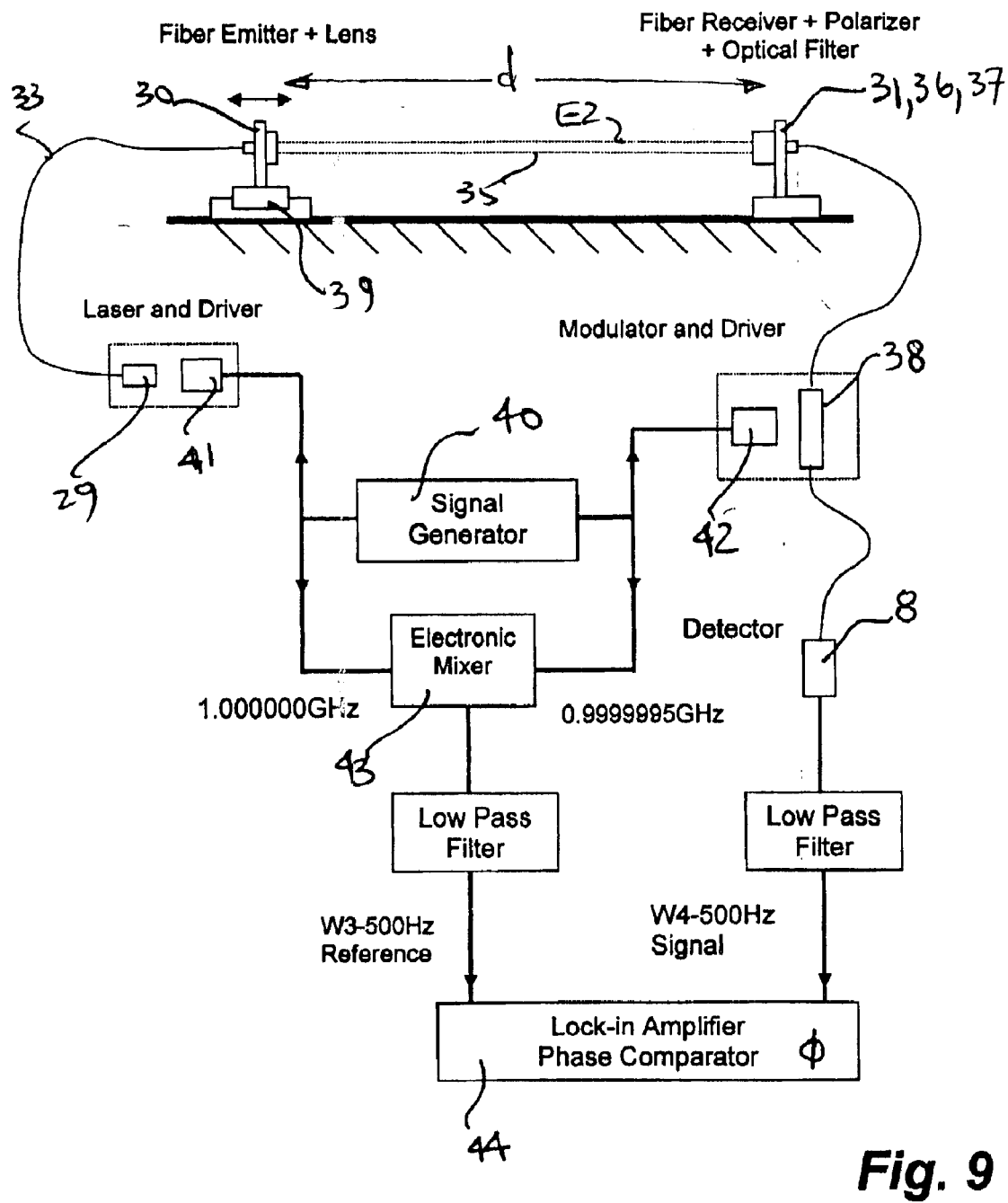
FIG. 9 is a schematic of a second example of an actual experiment proving the phase-shift sensitivity of the present invention using a 1 GHz measuring beam.

With reference to FIG. 9, a simple in-line experimental arrangement was used to validate measurement principles of the present invention.

A low power 1 GHz laser beam, emulating that reflected back from a rough object or surface 6 was modulated at a frequency difference of 500 Hz. The distance d of a fiber emitter 30 from a fiber receiver 31 was precisely varied using a linear translation stage. Implementing the present invention to determine distance d, the detector 8 measured phase-shifts φ with a precision of 1.2 degrees per millimeter of movement. The detector 8 achieved this precision without the need to react to frequencies greater than 500 Hz. This precision was achieved because the phase-shift can now be measured while still implementing a 1 GHz output beam having a wavelength of (0.3 meters) of 300 mm. Movement resolution at 1.2 degrees is 1.2/360*300 mm=1 mm. In contradistinction, however impractical, an optical detector 8 capable of direct measurement of phase-shift φ from a 500 Hz measurement beam would have an associated wavelength of $6 \times 10^5$ meters and 1.2 degree accuracy would represent movement as gross as 2000 meters.

In the experiment, a 1 mW, fiber-pigtailed 1550 nm laser diode 29 (PD-LD Inc., part number PL15N001TFCA-0-0-01) 32 was operated to emit beam 33, which emulates a beam received from a surface. The beam 33 was collimated by a lens 34 (Edmund Industrial Optics, part number L45-806) at the fiber-emitter 30 to form a parallel beam 35, 1 to 2 cm in diameter. The beam 35 was passed through a polarizer 36 (Lambda Research Optics Inc, part number PB-05B-1500) and a narrow band optical filter 37 (Lambda Research Optics Inc, part number 1550-F30-25.4) at the fiber receiver 31. The beam 35 fell directly on the 9 micron core input face of a fiber-pigtailed 1550 nm telecom modulator 38 (JDS Uniphase, part number 10023828). The polarizer 36 ensured that only linearly-polarized radiation entered the modulator pigtail 38, a condition necessary for high modulation efficiency. The narrow band optical filter 37 minimized the collection of spurious radiation by limiting the spectral passband to a narrow region centered on 1550 nm. Since no lens was used to focus the beam 35 into the modulator pigtail 38, the peak power traversing the modulator 38 was in the range 10 to 100 pW, similar to the power levels available when making measurements on a rough surface at a range of 5 to 10 m. The separation of the emitting and receiving assemblies was varied precisely by mounting one of the assemblies on the linear translation stage 39. The detector 8 was a low-noise InGaAs PIN diode with high gain transimpedance amplifier and 750 Hz electronic response bandwidth (New Focus Inc., part number 2153).

A Fluke type 6060A signal generator 40 was used to generate a first sine wave waveform signal $F_1$ at 1 GHz and to modulate the emitting laser diode output 35 via a commercial driver 41 (Maxim, part number Max 3261). A second sine wave waveform signal $F_2$ at 0.9999995 GHz was obtained from an HP type 8560 spectrum analyzer (not shown), using its built-in tracking generator facility to effectively lock the 1 GHz and 0.9999995 GHz signals to the same master clock. The 0.9999995 GHz signal was used to modulate the reflected beam via the telecom modulator 38 in conjunction with two commercial drivers 42 used in series (supplier WJ Communications, part number AH102). The electronic mixer 43 generated a phase reference to track fluctuations caused by instability of the high frequency drive signals. A high precision lock-in amplifier 44 (supplier Stanford Research Systems, part number SR 830) enabled phase comparison of the resulting third 500 Hz waveform signals W3,W4 to an accuracy in the order of 0.01 degrees. The arrangement as described exhibited slow random phase drift between the 500 Hz reference signal W3 and the 500 Hz detected signal W4, most likely due to uncompensated instability of the laser, modulator or drivers.

The separation between the fiber emitter 30 and fiber receiver 31 was varied using the linear translator stage 39. Despite the slow phase drift experienced in the experiment, a repeatable phase-shift φ of approximately 1.2 degrees per mm of movement was obtained upon varying the separation between the fiber emitter 30 and fiber receiver 31. This experiment and result confirmed the predicted phase sensitivity for 1 GHz modulation.

The embodiments of the invention for which an exclusive property or privilege is claimed are defined as follows:

1. A method for determining phase-shift between first and second electromagnetic radiation signals, the first electromagnetic radiation signal being modulated by a first waveform signal having a first frequency, the first electromagnetic radiation signal being transmitted at a surface which results in at least a portion of the first electromagnetic radiation signal being reflected as a second electromagnetic radiation signal comprising the steps of:

multiplying the first waveform signal by a second waveform signal modulated at a second frequency, the second frequency being different from the first frequency, for establishing a third waveform signal of known phase and having a third frequency equal to the difference of the first and second frequencies;

modulating the second electromagnetic radiation signal by the second waveform signal to form a third electromagnetic radiation signal;

receiving the third electromagnetic radiation signal at a detector for establishing a detector output waveform signal having a shifted phase at the third frequency; and comparing the known phase of the third waveform signal and the shifted phase for establishing a phase-shift between the first and second electromagnetic radiation signals.

2. The method of claim 1 further comprising the steps of:

modulating the first electromagnetic radiation signal with the first waveform signal having a high first frequency; and multiplying the first and second electromagnetic radiation signal by the second waveform signal having high second frequency which is substantially equal to the first frequency so that the third frequency is a low frequency.

3. The method of claim 1 wherein the first electromagnetic radiation signal is a laser beam.

4. The method of claim 1 further comprising the steps of:

directing the first electromagnetic radiation signal through focusing optics onto the remote surface; and directing the second electromagnetic radiation signal through an optical modulator for modulating the second electromagnetic radiation signal by the second waveform signal to form the third electromagnetic radiation signal.

5. The method of claim 4 further comprising the steps of:

directing the first electromagnetic radiation signal through focusing optics onto the surface;

receiving the second electromagnetic radiation signal through the focusing optics; and redirecting the second electromagnetic radiation signal through a optical modulator for modulating the second electromagnetic radiation signal by the second waveform signal to form the third electromagnetic radiation signal.

6. The method of claim 5 further comprising the steps of:
expanding the first electromagnetic radiation signal;
collimating the first electromagnetic radiation signal;
directing the expanded first electromagnetic radiation signal through the focusing optics onto the surface; and
receiving an expanded second electromagnetic radiation signal which substantially fills the focusing optics.

7. The method of claim 1 wherein the first and second electromagnetic radiation signals each traverse a distance to and from the surface further comprising the step of calculating the traversed distance from the phase-shift.

8. The method of claim 7 further comprising the steps of repeating the preceding steps at one or more additional and different first waveform signals for resolving ambiguities in the distances calculated from each phase-shift at each of the one or more different first waveform signals.

9. The method of claim 2 wherein the first and second waveform signals have frequencies selected from a range of between about 50 MHz and about 2 GHz.

10. The method of claim 2 wherein the first and second waveform signals have frequencies which are selected so as to result in a third frequency having a range of between about 500 Hz and about 100 kHz.

11. The method of claim 1 wherein a plurality of second electromagnetic radiation signals are reflected from an area from a remote surface and further comprising the steps of:
modulating each of the second electromagnetic radiation signals by the second waveform signal to form a plurality of corresponding third electromagnetic radiation signals;
receiving the plurality of third electromagnetic radiation signals at a spatial array of detectors for establishing a plurality of detector output waveform signals for the area, each of which has a shifted phase at the third frequency; and
comparing the known phase of the third waveform signal and each shifted phase for establishing a plurality of phase-shifts between the first and second electromagnetic radiation signals.

12. The method of claim 11 wherein each of the plurality second electromagnetic radiation signals traverse a distance to and from the area of the remote surface further comprising the step of calculating each of the traversed distances from the phase-shift for each of the plurality second electromagnetic radiation signals.

13. The method of claim 1 further comprising the steps of:
scanning the first electromagnetic radiation signal over the remote surface for reflection of a plurality of sequential second electromagnetic radiation signals from an area of the remote surface and repeating the modulating step upon each sequential second electromagnetic radiation signal for forming a plurality of sequential third electromagnetic radiation signals;
sequentially receiving the sequential third electromagnetic radiation signals at the detector for establishing a plurality of sequential detector output waveform signals for the area, each of which has a shifted phase at the third frequency; and
comparing the known phase of the third waveform signal and each shifted phases of the detector output waveform signals for establishing a plurality of phase-shifts between the first and second electromagnetic radiation signals.

14. The method of claim 13 wherein each of the sequential second electromagnetic radiation signals traverse a distance to and from the area of the remote surface further comprising the step of calculating each of the traversed distances from the phase-shift for each of the sequential second electromagnetic radiation signals.

15. A method for measuring distance to a remote surface comprising:
generating a first waveform signal at a first frequency;
generating a second waveform signal at a second frequency which is different than the first frequency;
multiplying the first and second waveform signals to obtain a reference waveform signal at a reference phase and at a third frequency;
modulating a first electromagnetic radiation signal by the first waveform signal;
directing the modulated first electromagnetic radiation signal at the remote surface;
receiving a second electromagnetic radiation signal which is a least a portion of the first electromagnetic radiation signal reflected from the remote surface;
modulating the second electromagnetic radiation signal with the second waveform signal to form a third electromagnetic radiation signal;
receiving the third electromagnetic radiation signal at a detector for establishing a shifted waveform signal having a shifted phase at the third frequency; and
comparing the reference phase and the shifted phase for establishing a phase-shift related to the distance to the remote surface.

16. Apparatus for determining phase-shift between a first second electromagnetic radiation signal which is reflected from a surface as a second electromagnetic radiation signal comprising:
a first modulator for modulating the first electromagnetic radiation signal by a first waveform signal having a first frequency;
a second modulator for multiplying the first waveform signal by a second waveform signal modulated at a second frequency, the second frequency being different from the first frequency, for establishing a third waveform signal of known phase and having a third frequency equal to the difference of the first and second frequencies;
a third modulator for modulating the second electromagnetic radiation signal by the second waveform signal to form a third electromagnetic radiation signal;
an electromagnetic radiation detector for receiving the third electromagnetic radiation signal and for establishing a detector output waveform signal having a shifted phase at the third frequency; and
a comparator for comparing the known phase of the third waveform signal and the shifted phase of the detector output waveform signal for establishing a phase-shift between the first and second electromagnetic radiation signals.

17. The apparatus of claim 16 further comprising:
a controller for determining a distance traversed by the first and second electromagnetic radiation signals using the phase-shift.

18. The apparatus of claim 17 further comprising an array of electromagnetic radiation detectors for establishing a plurality of detector output waveform signals corresponding to an area on the remote surface, each detector output waveform signal having a shifted phase at the third frequency so that comparator can establish a plurality of phase-shifts between the first and second electromagnetic radiation signals and their respective distances traversed.

19. The apparatus of claim 17 further comprising an optical scanner for directing the first electromagnetic radiation signal to scan over along a path across the remote surface for the reflection of sequential second electromagnetic radiation signals from the remote surface and repeating the modulating step for each sequential second electromagnetic radiation signal for forming as plurality of sequential third electromagnetic radiation signals received at the electromagnetic radiation detector for establishing a plurality of sequential detector output waveform signals for the remote surface, each of which has a shifted phase at the third frequency; and comparing the known phase of the third waveform signal and each shifted phase of the detector output waveform signals for establishing a plurality of phase-shifts between the first and second electromagnetic radiation signals.

* * * * *